United States Patent
Oosawa et al.

(10) Patent No.: US 12,459,043 B2
(45) Date of Patent: Nov. 4, 2025

(54) WIRE ELECTRIC DISCHARGE MACHINE, CORRECTION DEVICE, AND CORRECTION METHOD

(71) Applicant: FANUC CORPORATION, Minamitsuru-gun (JP)

(72) Inventors: Tomohito Oosawa, Yamanashi-ken (JP); Hiroyuki Furukawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 605 days.

(21) Appl. No.: 17/800,823

(22) PCT Filed: Feb. 19, 2021

(86) PCT No.: PCT/JP2021/006414
§ 371 (c)(1),
(2) Date: Aug. 18, 2022

(87) PCT Pub. No.: WO2021/172218
PCT Pub. Date: Sep. 2, 2021

(65) Prior Publication Data
US 2023/0083342 A1    Mar. 16, 2023

(30) Foreign Application Priority Data
Feb. 25, 2020 (JP) ................. 2020-029386

(51) Int. Cl.
*B23H 7/26* (2006.01)
*G05B 19/402* (2006.01)

(52) U.S. Cl.
CPC ............. *B23H 7/26* (2013.01); *G05B 19/402* (2013.01); *B23H 2500/20* (2013.01); *G05B 2219/37506* (2013.01); *G05B 2219/45221* (2013.01)

(58) Field of Classification Search
CPC ........ B23H 7/26; B23H 2500/20; B23H 7/20; B23H 7/065; G05B 19/402; G05B 2219/37506; G05B 2219/45221
See application file for complete search history.

(56) References Cited

U.S. PATENT DOCUMENTS

| 2006/0219667 | A1* | 10/2006 | Martin ................. | B23H 7/065 |
| | | | | 219/69.12 |
| 2017/0095869 | A1* | 4/2017 | Domori ................. | B23H 7/06 |
| 2018/0029153 | A1 | 2/2018 | Ookubo et al. | |

FOREIGN PATENT DOCUMENTS

| CN | 107848052 A | 3/2018 |
| EP | 0920945 A2 | 6/1999 |

(Continued)

OTHER PUBLICATIONS

International Search Report (ISR) (PCT Form PCT/ISA/210), in PCT/JP2021/006414, dated Apr. 20, 2021.

(Continued)

*Primary Examiner* — Mohammad Ali
*Assistant Examiner* — Dhruvkumar Patel
(74) *Attorney, Agent, or Firm* — Sughrue Mion, PLLC

(57) ABSTRACT

Provided are a wire electric discharge machine, a correction device, and a correction method which accurately correct position information indicating the position of a supporting point of each of an upper guide and a lower guide. The correction device includes: a storage unit that stores the position information; an inclination control unit that causes a wire electrode to incline at a predetermined angle; a measurement unit that measures a relative movement amount from a state in which the lower guide and a measurement site are separated by a predetermined distance in a relative movement direction to a state in which the wire electrode inclined at the predetermined angle reaches the measurement site; and an information correction unit that (Continued)

corrects the position information of the storage unit on the basis of the predetermined angle and the relative movement amount.

9 Claims, 12 Drawing Sheets

(56) References Cited

FOREIGN PATENT DOCUMENTS

| | | | |
|---|---|---|---|
| JP | 1-193126 A | | 8/1989 |
| JP | H11-70415 A | | 3/1999 |
| JP | 2005199358 A | * | 7/2005 |
| JP | 2006-281439 A | | 10/2006 |
| JP | 2007-301666 A | | 11/2007 |
| JP | 2011110677 A | * | 6/2011 |
| TW | 485076 B | | 5/2002 |

OTHER PUBLICATIONS

Office Action issued Dec. 18, 2024 in Taiwanese Application No. 110105896.
Chinese Office Action dated Mar. 27, 2025 in Application No. 202180016495.5.

* cited by examiner

WIRE ELECTRIC DISCHARGE MACHINE, CORRECTION DEVICE, AND CORRECTION METHOD

TECHNICAL FIELD

The present invention relates to a wire electric discharge machine, and a correction device and a correction method applied to such a wire electric discharge machine.

BACKGROUND ART

In the field of wire electric discharge machines, a technique is known in which a wire electrode is caused to be inclined at a predetermined angle by making the relative positions between an upper guide and a lower guide different from each other. An example thereof is disclosed, for example, in JP H11-070415 A.

SUMMARY OF THE INVENTION

In JP H11-070415 A, in a method of measuring an amount of wear of an upper guide and a lower guide, a technique of causing the wire electrode to be inclined is used. However, the technique of causing the wire electrode to be inclined can also be applied to a tapering machining process that imparts a tapered shape to a workpiece, i.e., an object to be machined.

However, in such a tapering machining process, shifting of the position information indicative of the position of a supporting point of each of the upper guide and the lower guide significantly influences the shape of the workpiece after completion of machining. Therefore, in order to carry out the tapering machining process with high accuracy, it is insufficient simply to cause the wire electrode to be inclined, and it is desirable to make the position information indicative of the position of the supporting point of each of the upper guide and the lower guide as accurate as possible.

Thus, the present invention has the object of providing a wire electric discharge machine, a correction device, and a correction method, which correct with high accuracy the position information indicative of the position of the supporting point of each of an upper guide and a lower guide.

One aspect of the present invention is characterized by a correction device configured to correct position information indicative of a position of an upper side supporting point of an upper guide and a position of a lower side supporting point of a lower guide of a wire electric discharge machine configured to support a wire electrode, wherein the wire electric discharge machine includes a support platform including a support surface configured to support an object to be measured including a measurement site, the support platform being arranged between the upper guide and the lower guide in a vertical direction of the support surface, and wherein the correction device includes a storage unit configured to store the position information, an inclination control unit configured to, in a state in which the wire electrode and the measurement site of the object to be measured which is supported on the support surface face toward each other in a direction of relative movement perpendicular to the vertical direction, position the upper guide closer to the measurement site than the lower guide in the direction of relative movement, to thereby cause the wire electrode to be inclined at a predetermined angle, a measurement unit configured to, by causing relative movement of the upper guide and the lower guide along the direction of relative movement from a state in which the lower guide and the measurement site are separated from each other by a predetermined distance in the direction of relative movement, measure an amount of relative movement of the upper guide, the lower guide, and the wire electrode with respect to the measurement site, caused until the wire electrode which is inclined at the predetermined angle reaches the measurement site, and an information correction unit configured to correct the position information in the storage unit, based on the predetermined angle and the amount of relative movement.

Another aspect of the present invention is characterized by a wire electric discharge machine, including an upper guide including an upper side supporting point configured to support a wire electrode, a lower guide including a lower side supporting point configured to support the wire electrode together with the upper guide, a support platform including a support surface configured to support an object to be measured including a measurement site, the support platform being arranged between the upper guide and the lower guide in a vertical direction of the support surface, a storage unit configured to store position information indicative of a position of the upper side supporting point and a position of the lower side supporting point, an inclination control unit configured to, in a state in which the wire electrode and the measurement site of the object to be measured which is supported on the support surface face toward each other in a direction of relative movement perpendicular to the vertical direction, position the upper guide closer to the measurement site than the lower guide in the direction of relative movement, to thereby cause the wire electrode to be inclined at a predetermined angle, a measurement unit configured to, by causing relative movement of the upper guide and the lower guide along the direction of relative movement from a state in which the lower guide and the measurement site are separated from each other by a predetermined distance in the direction of relative movement, measure an amount of relative movement of the upper guide, the lower guide, and the wire electrode with respect to the measurement site, caused until the wire electrode which is inclined at the predetermined angle reaches the measurement site, and an information correction unit configured to correct the position information in the storage unit, based on the predetermined angle and the amount of relative movement.

Still another aspect of the present invention is characterized by a correction method of correcting position information indicative of a position of an upper side supporting point of an upper guide and a position of a lower side supporting point of a lower guide of a wire electric discharge machine configured to support a wire electrode, wherein the wire electric discharge machine includes a support platform including a support surface configured to support an object to be measured including a measurement site, the support platform being arranged between the upper guide and the lower guide in a vertical direction of the support surface, and the correction method including a storage step of storing the position information, an inclination control step of, in a state in which the wire electrode and the measurement site of the object to be measured which is supported on the support surface face toward each other in a direction of relative movement perpendicular to the vertical direction, positioning the upper guide closer to the measurement site than the lower guide in the direction of relative movement, and thereby causing the wire electrode to be inclined at a predetermined angle, a measurement step of, by causing relative movement of the upper guide and the lower guide along the direction of relative movement from a state in which the lower guide and the measurement site are separated from each other by a predetermined distance in the direction of relative movement, measuring an amount of relative movement of the upper guide, the lower guide, and the wire electrode with respect to the measurement site, caused until the wire electrode which is inclined at the predetermined angle reaches the measurement site, and an information correction step of correcting the position information stored in the storage step, based on the predetermined angle and the amount of relative movement.

According to the present invention, the wire electric discharge machine, the correction device, and the correction method are provided, which can correct with high accuracy the position information indicative of the position of the supporting point of each of the upper guide and the lower guide.

DESCRIPTION OF THE INVENTION

Hereinafter, a detailed description will be given with reference to the accompanying drawings concerning the wire electric discharge machine, the correction device, and the correction method according to the present invention.

Embodiment

Figure 1:
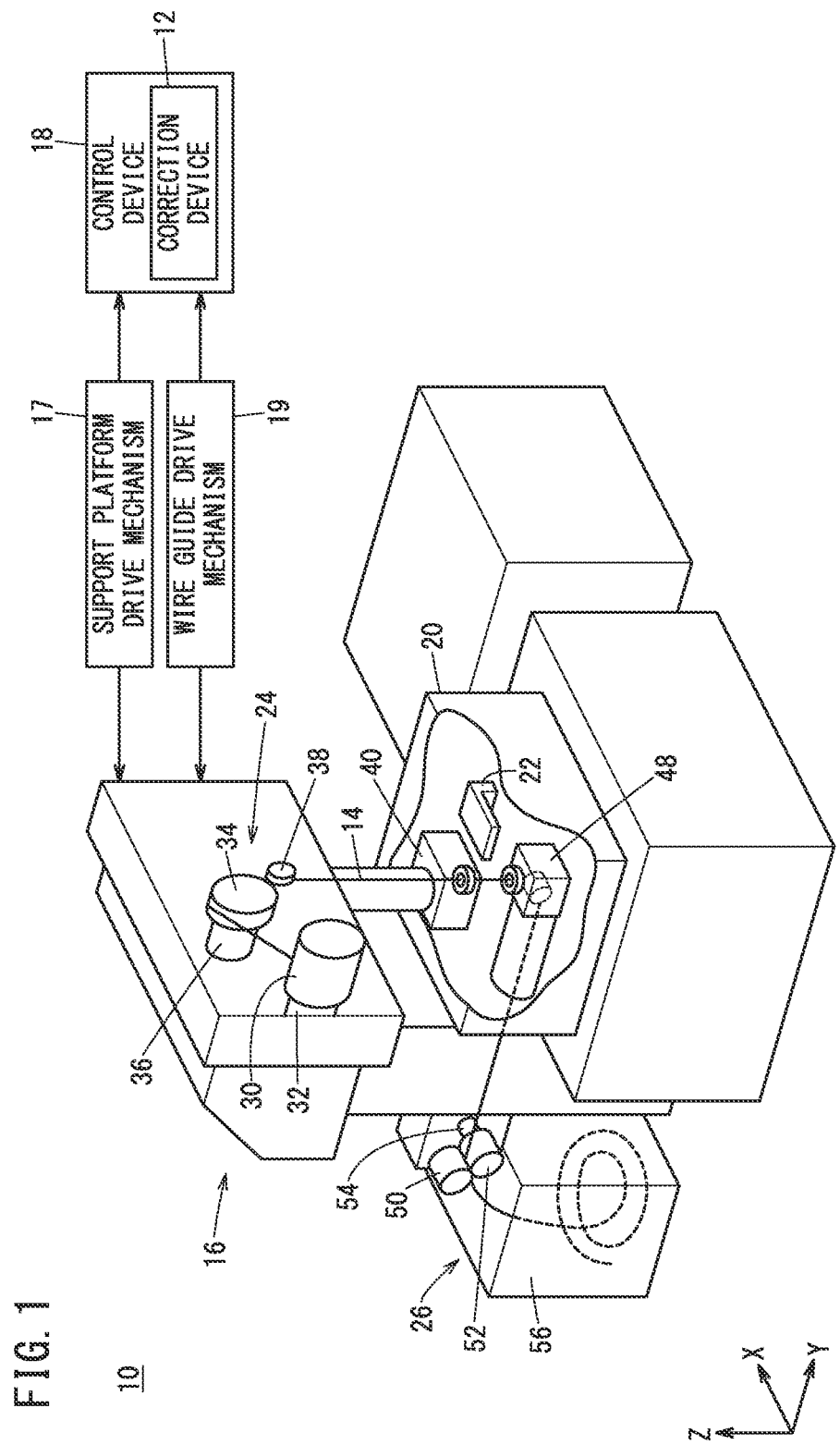
FIG. 1 is a configuration diagram showing an overall configuration of a wire electric discharge machine according to an embodiment of the present invention.

FIG. 1 is a configuration diagram showing an overall configuration of a wire electric discharge machine 10 according to an embodiment of the present invention.

Prior to providing a description of the wire electric discharge machine 10, a correction device 12, and the correction method of the present embodiment, the arrows shown in FIG. 1 will be described. In FIG. 1, three directions indicated by the arrows X, Y, and Z are axial directions of the wire electric discharge machine 10, and the directions are perpendicular to each other.

Hereinafter, a description will be given concerning the wire electric discharge machine 10 shown in FIG. 1. The wire electric discharge machine 10 is a machine tool that carries out electric discharge machining on an object to be machined (workpiece), by causing an electric discharge to be generated between a wire electrode 14 and the object to be machined.

The wire electric discharge machine 10 is equipped with a machine main body 16, a support platform drive mechanism 17, a control device 18, and a wire guide drive mechanism 19. The machine main body 16 is a machine that executes electric discharge machining by way of the wire electrode 14. The machine main body 16 of the present embodiment includes a work-pan 20, a support platform 22, a supply system 24, and a collecting system 26.

The work-pan 20 is a tank in which a working fluid is stored. The working fluid is a liquid having a dielectric property, for example, deionized water.

Figure 7A:
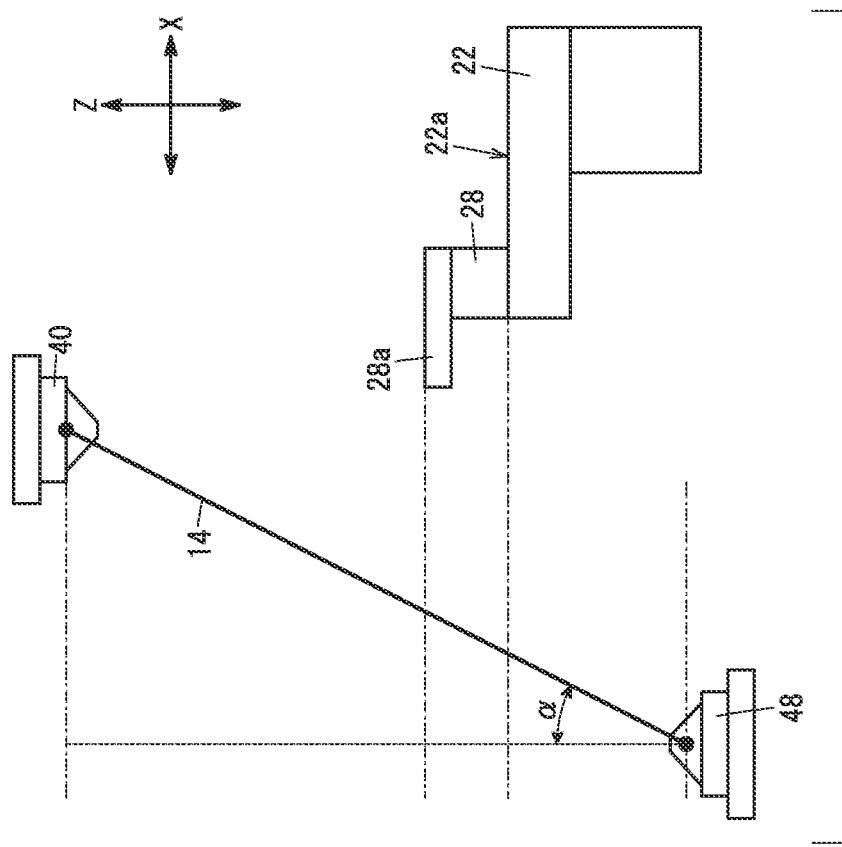
FIG. 7A is a first diagram for describing an inclination control step according to the embodiment.

The support platform 22 is a pedestal that is arranged in the work-pan 20 and is immersed in the working fluid, and includes a support surface 22a having an XY direction defining a planar direction, and a Z direction defining a vertical direction (see FIG. 7A). By way of such a support surface 22a, the support platform 22 supports an object within the working fluid.

The object that is supported by the support surface 22a of the support platform 22 is an object to be machined during execution of electric discharge machining. However, in the present embodiment, the object supported by the support surface is also an object to be measured (a jig) 28 including a measurement site 28a that protrudes in the X direction or the Y direction on the support surface 22a (FIG. 7A).

Figure 2:
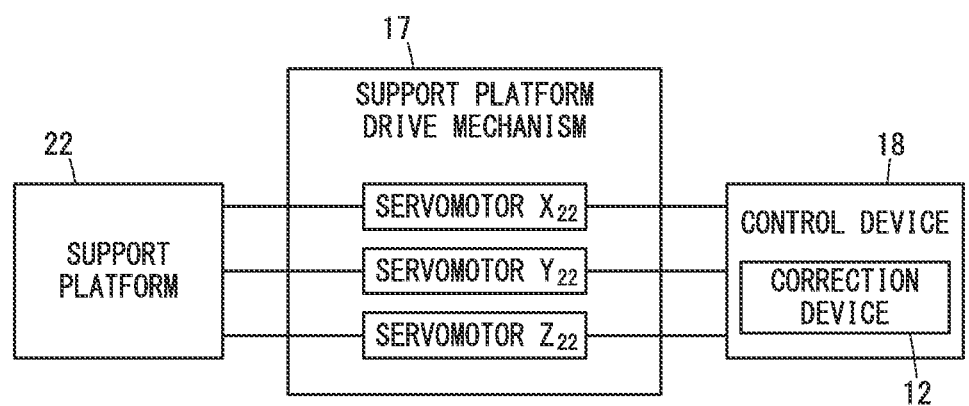
FIG. 2 is a connection configuration diagram of a support platform, a support platform drive mechanism, and a control device.

FIG. 2 is a connection configuration diagram of the support platform 22, the support platform drive mechanism 17, and the control device 18.

The support platform 22 is connected to the support platform drive mechanism 17. The support platform drive mechanism 17 is a mechanism that enables the support platform 22 to move inside the work-pan 20 along each of the X, Y, and Z directions. Such a support platform drive mechanism 17 includes in the configuration thereof, for example, a servomotor $X_{22}$ that causes the support platform 22 to move along the X direction, a servomotor $Y_{22}$ that causes the support platform 22 to move along the Y direction, and a servomotor $Z_{22}$ that causes the support platform 22 to move along the Z direction.

Each of the plurality of servomotors (the servomotor $X_{22}$, the servomotor $Y_{22}$, and the servomotor $Z_{22}$) possessed by the support platform drive mechanism 17 is provided with a non-illustrated encoder. In accordance therewith, it becomes possible to output to the control device 18 and the correction device 12 signals indicating the amount of rotation of each of the servomotor $X_{22}$, the servomotor $Y_{22}$, and the servomotor $Z_{22}$.

The supply system 24 is equipped with a wire bobbin 30, a first motor 32, a brake roller 34, a second motor 36, a tension detection unit 38, and an upper guide 40. Among these elements, the wire bobbin 30 is a rotatable bobbin around which the wire electrode 14, which is yet to be used, is wound. The first motor 32 is a motor that applies a torque to the wire bobbin 30.

Further, the brake roller 34 is a rotatable roller that applies a braking force caused by friction to the wire electrode 14 that is suspended across from the wire bobbin 30. The second motor 36 is a motor that applies a brake torque to the brake roller 34. In addition, the tension detection unit 38 is a detector that detects a magnitude of the tension of the wire electrode 14.

The upper guide 40 is a wire guide that guides the wire electrode 14 toward a later-described lower guide 48 while supporting the wire electrode 14 that has passed through the brake roller 34. The upper guide 40 is arranged on the support surface 22*a* side (an upper side) with respect to the support platform 22 in a vertical direction (Z direction) of the support surface 22*a*.

Figure 3A:
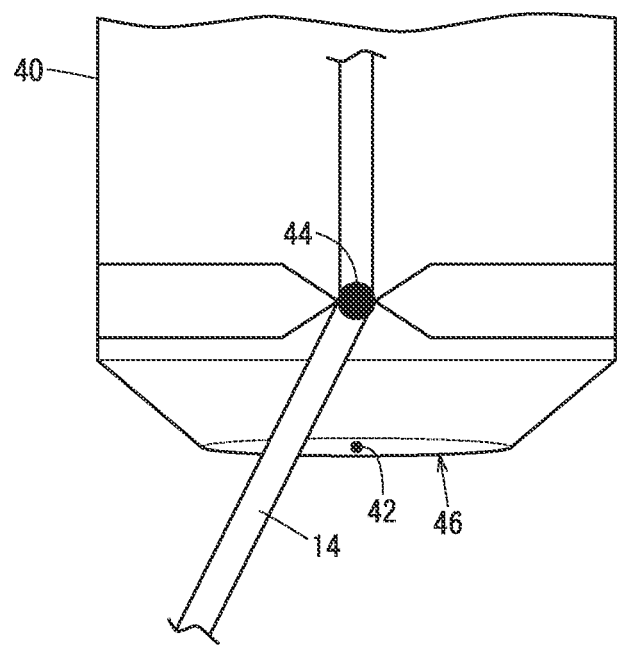
FIG. 3A is a schematic configuration diagram of an upper guide.

FIG. 3A is a schematic configuration diagram of the upper guide 40.

The upper guide 40 includes a reference point 42 and an upper side supporting point 44. Among these elements, the reference point 42 is a predetermined point indicating a reference position at a time when the position of the upper guide 40 in the Z direction is represented. For example, it is known that the distance in the Z direction between the upper guide 40 and the support platform 22 can be measured by a probe or the like, and the distance measured at this time is a distance between the reference point 42 and the support platform 22. As an example, the reference point 42 according to the present embodiment is assumed to be at the same position in the Z direction as an opening 46 provided at a lower end of the upper guide 40.

The upper side supporting point 44 is a supporting point when the upper guide 40 supports the wire electrode 14. Moreover, it is known that it is practically difficult to uniformly determine the Z-direction position of the upper side supporting point 44 in the upper guide 40. The reason for such a difficulty comes about from the fact that the designed position and the actual position of the upper side supporting point 44 do not coincide with each other, due to individual differences of the upper guide 40, or due to the influence of a force received from the wire electrode 14 which is the object that is supported.

The collecting system 26 is equipped with a lower guide 48, a pinch roller 50, a feed roller 52, a third motor 54, and a collection box 56. Among these elements, the lower guide 48 is a wire guide which guides the wire electrode 14 that has passed through the upper guide 40 of the supply system 24, toward the pinch roller 50 and the feed roller 52. The lower guide 48 is arranged on a side opposite to the upper guide 40 (a lower side) across the support platform 22 in the vertical direction (Z direction) of the support surface 22*a*.

Figure 3B:
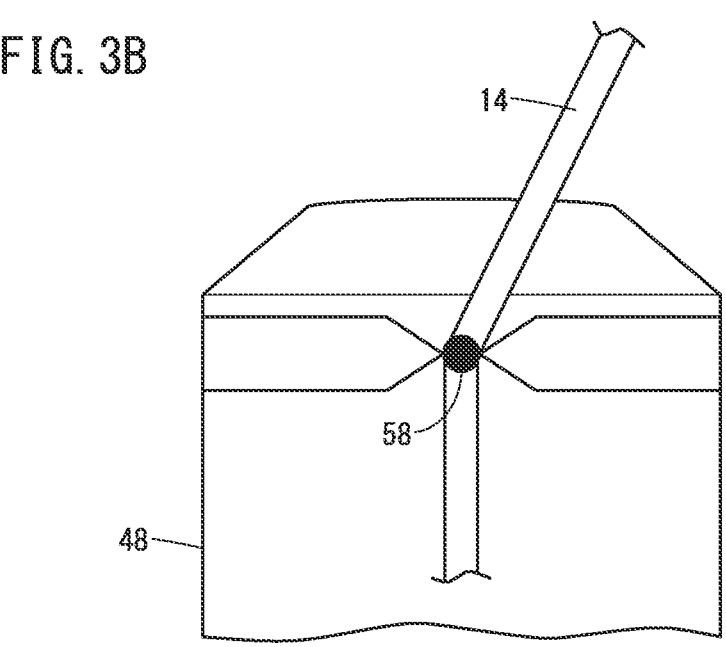
FIG. 3B is a schematic configuration diagram of a lower guide.

FIG. 3B is a schematic configuration diagram of the lower guide 48.

The lower guide 48 includes a lower side supporting point 58. The lower side supporting point 58 is a supporting point when the lower guide 48 supports the wire electrode 14. Moreover, concerning the lower side supporting point 58, it is known that it is practically difficult to uniformly determine the position thereof in the Z direction, for the same reason as that of the upper side supporting point 44.

The pinch roller 50 and the feed roller 52 are rotatable rollers which mutually sandwich the wire electrode 14 that has passed through the lower guide 48. The third motor 54 is a motor that applies a torque to the feed roller 52. The collection box 56 is a box for collecting the wire electrode 14 that has passed through the pinch roller 50 and the feed roller 52.

The supply system 24 and the collecting system 26 realize transportation of the wire electrode 14 from the wire bobbin 30 to the brake roller 34, the upper guide 40, the lower guide 48, the feed roller 52, the pinch roller 50, and the collection box 56 in this order.

Figure 4:
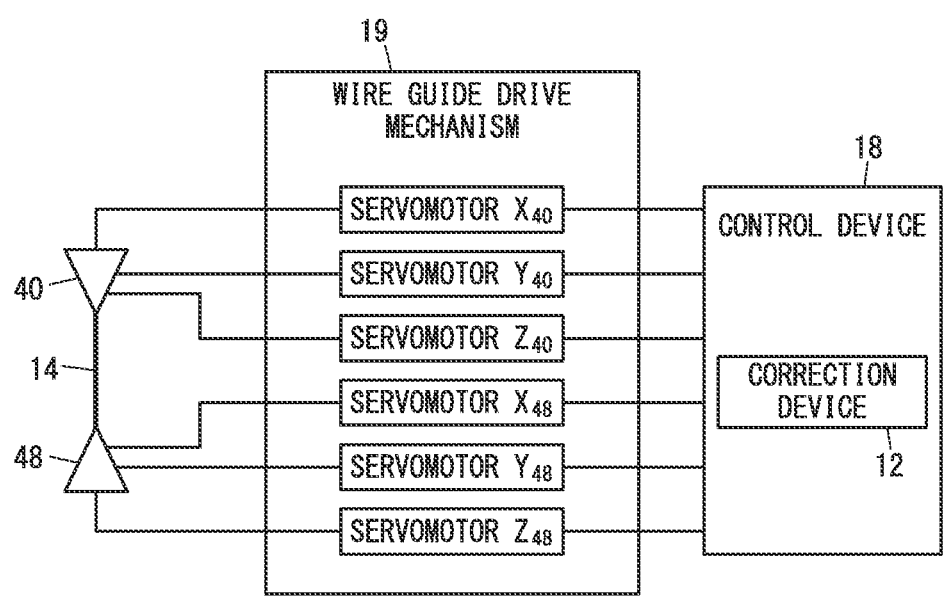
FIG. 4 is a connection configuration diagram of the upper guide and the lower guide, a wire guide drive mechanism, and the control device.

FIG. 4 is a connection configuration diagram of the upper guide 40 and the lower guide 48, the wire guide drive mechanism 19, and the control device 18.

The upper guide 40 and the lower guide 48 are connected to the wire guide drive mechanism 19. The wire guide drive mechanism 19 is a mechanism that allows each of the upper guide 40 and the lower guide 48 to move in the work-pan 20 along the X direction (a U direction parallel to the X direction), the Y direction (a V direction parallel to the Y direction), and the Z direction. Such a wire guide drive mechanism 19 includes a servomotor $X_{40}$, a servomotor $Y_{40}$, and a servomotor $Z_{40}$ that cause the upper guide 40 to move along each of the XYZ directions. Further, the wire guide drive mechanism 19 further includes a servomotor $X_{48}$, a servomotor $Y_{48}$, and a servomotor $Z_{48}$ that cause the lower guide 48 to move along each of the XYZ directions.

Each of the servomotor $X_{40}$, the servomotor $Y_{40}$, the servomotor $Z_{40}$, the servomotor $X_{48}$, the servomotor $Y_{48}$, and the servomotor $Z_{48}$ is provided with a non-illustrated encoder, similar to the case of the plurality of servomotors of the support platform drive mechanism 17. In accordance therewith, it becomes possible to output to the control device 18 and the correction device 12 signals indicative of the amount of rotation of each of the servomotor $X_{40}$, the servomotor $Y_{40}$, the servomotor $Z_{40}$, the servomotor $X_{48}$, the servomotor $Y_{48}$, and the servomotor $Z_{48}$.

The above is an example of the configuration of the machine main body 16. Next, a description will be given concerning the control device 18, and the correction device 12 of the present embodiment which is provided in the control device 18.

The control device 18, for example, is a numerical control device, and is a device that controls the machine main body 16. The control device 18 is provided integrally with the correction device 12 according to the present embodiment.

Figure 5:
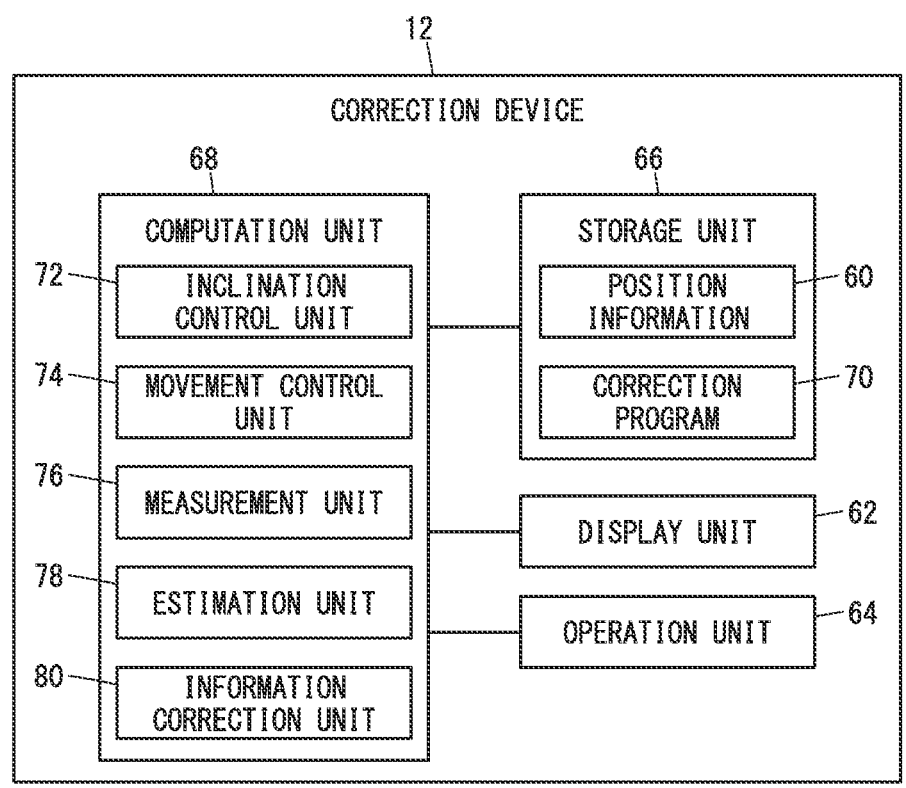
FIG. 5 is a schematic configuration diagram of a correction device according to an embodiment.

FIG. 5 is a schematic configuration diagram of the correction device 12 according to the embodiment.

The correction device 12 is a device which is provided in order to correct the position information 60 indicative of the position of the supporting point of each of the upper guide 40 and the lower guide 48, and is equipped with a display unit 62, an operation unit 64, a storage unit 66, and a computation unit 68.

Among these elements, the display unit 62 is a display device having a screen for displaying information. Although the screen of the display unit 62 is not limited to this feature, for example, the screen may be a liquid crystal screen.

The operation unit 64 is provided in order to allow an operator to input information to the correction device 12, and is constituted, for example, by a keyboard, a mouse, or a touch panel that is attached to the screen of the display unit 62.

The storage unit 66 serves to store information. The storage unit 66 is constituted by hardware such as, for example, a RAM (Random Access Memory), a ROM (Read Only Memory), and the like. The storage unit 66 stores in advance the aforementioned position information 60, and a predetermined correction program 70.

The position information 60 is a target of the correction that is realized by the correction device 12. Therefore, the position information 60 at the point in time of being stored in advance in the storage unit 66 does not have to be information with high accuracy, and it is sufficient if information with a certain degree of accuracy is prepared as in the conventional technique.

The correction program 70 is a program that defines a correction method for accurately correcting the position information 60. The details of such a correction method will be described later.

The computation unit 68 processes information by carrying out computations. The computation unit 68 is constituted by hardware, for example, such as a CPU (Central Processing Unit), a GPU (Graphics Processing Unit), and the like.

Further, the computation unit 68 according to the present embodiment is equipped with an inclination control unit 72, a movement control unit 74, a measurement unit 76, an estimation unit 78, and an information correction unit 80. These units can be realized by the computation unit 68 reading in and executing the above-described correction program 70.

The inclination control unit 72, in a state in which the wire electrode 14 and the measurement site 28a on the support surface 22a face toward each other in the direction of relative movement, by positioning the upper guide 40 closer to the measurement site 28a than the lower guide 48 in the direction of relative movement, causes the wire electrode 14 to be inclined at a predetermined angle α. In the present embodiment, the direction of relative movement is in the X direction or the Y direction, and indicates a direction in which the wire electrode 14 and the measurement site 28a on the support platform 22 face toward each other.

By controlling the wire guide drive mechanism 19, the inclination control unit 72 causes the upper guide 40 to be positioned closer to the measurement site 28a than the lower guide 48 in the direction of relative movement. At this time, it becomes necessary to carry out relative movement between the upper guide 40 and the lower guide 48, and the amount of relative movement thereof can be grasped on the basis of the signals output by the encoders provided respectively in the plurality of servomotors of the wire guide drive mechanism 19.

The movement control unit 74, by controlling the aforementioned support platform drive mechanism 17, causes relative movement of the upper guide 40 and the lower guide 48 with respect to the support platform 22 along the direction of relative movement. After the inclination control unit 72 has caused the wire electrode 14 to become inclined, the movement control unit 74 causes the wire electrode 14 to undergo relative movement while maintaining the inclination thereof. Moreover, it should be noted that the movement control unit 74 may cause the upper guide 40 and the lower guide 48 to be moved along the direction of relative movement by controlling the wire guide drive mechanism 19.

The measurement unit 76 measures an amount of relative movement of the upper guide 40, the lower guide 48, and the wire electrode 14 with respect to the measurement site 28a, caused until the wire electrode 14 arrives at the measurement site 28a. In particular, the measurement unit 76 according to the present embodiment measures the amount of relative movement caused from when the lower guide 48 and the measurement site 28a are in a state of being separated from each other by a predetermined distance $L_{ini}$ in the direction of relative movement until when the wire electrode 14, which is inclined at the predetermined angle α, arrives at the measurement site 28a (refer to FIG. 8).

The amount of relative movement can be measured on the basis of the signals output by the encoder provided in each of the plurality of servomotors of the support platform drive mechanism 17. Further, in performing such a measurement, after having initiated the relative movement, it is necessary to detect whether or not the wire electrode 14 has arrived at the measurement site 28a. Such a detection can be realized, for example, by carrying out the relative movement while a voltage of a predetermined magnitude is applied to the wire electrode 14 and then getting a reading of a change in the voltage value.

Hereinafter, the predetermined distance $L_{ini}$ is also referred to as an initial separation distance $L_{ini}$. Further, the amount of relative movement caused from when the lower guide 48 and the measurement site 28a are in a state of being separated from each other by the initial separation distance $L_{ini}$ in the direction of relative movement until when the wire electrode 14, which is inclined at the predetermined angle α, arrives at the measurement site 28a may also be referred to as an attained amount of movement u.

The estimation unit 78 determines an estimated amount of movement u', on the basis of an estimated separation distance, which is an estimated value of a separation distance between the lower side supporting point 58 and the measurement site 28a in the Z direction, and the predetermined angle α. The estimated amount of movement u' indicates an estimated value of the amount of relative movement caused until the inclined wire electrode 14 arrives at the measurement site 28a. Further, the estimated separation distance, which is used when estimating the estimated amount of movement u', is a value that is estimated in advance by the operator.

The information correction unit 80 corrects the position information 60 based on the angle of inclination of the wire electrode 14 and the attained amount of movement u. More specifically, as will be discussed later, the information correction unit 80 according to the present embodiment corrects the position information 60, based on a difference between the attained amount of movement u measured by the measurement unit 76 and the estimated amount of movement u' estimated by the estimation unit 78, and the predetermined angle α.

The above is an example of the configuration of the correction device 12 according to the present embodiment. Next, a description will be given concerning a correction method of the wire electric discharge machine 10, which is executed by the correction device 12.

Figure 6:
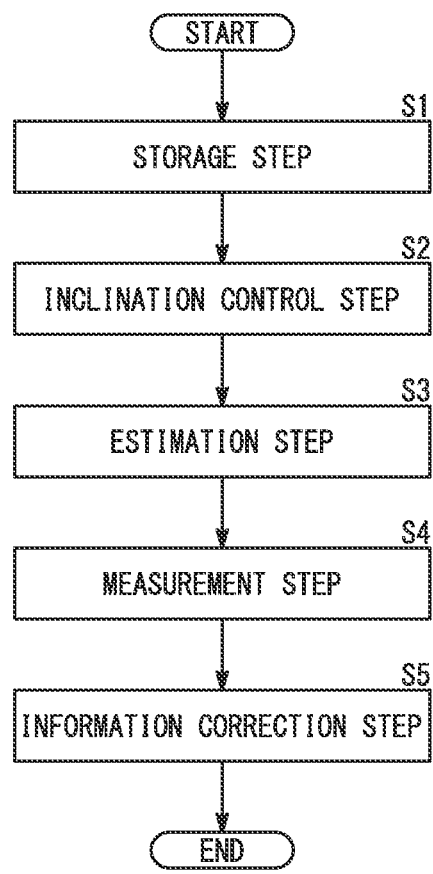
FIG. 6 is a flowchart illustrating a process flow of a correction method according to the embodiment.

FIG. 6 is a flowchart illustrating a process flow of the correction method according to the embodiment.

The correction method includes a storage step (S1), an inclination control step (S2), a measurement step (S4), and an information correction step (S5). Further, in the present embodiment, as shown in FIG. 6, an estimation step (S3) is further included as a step performed before the information correction step. Hereinafter, descriptions will be given concerning each of these steps.

Moreover, in the following description of the correction method, the description will be made based on the assumption that the aforementioned direction of relative movement is the X direction. The measurement site 28a of the object to be measured (the jig) 28 is placed on the support surface 22a so as to project in the X direction.

The storage step is a step of storing the position information 60. The position information 60 is stored in the storage unit 66. As noted previously, the position information 60 is information that serves as a target of the correction. Accordingly, the accuracy of the position information 60 stored at this point in time may be the same accuracy as noted previously.

The inclination control step is a step of causing the wire electrode 14 to be inclined at the predetermined angle α, by positioning the upper guide 40 closer to the measurement site 28a than the lower guide 48 in the direction of relative movement, in a state in which the measurement site 28a and the wire electrode 14 are made to face toward each other in the X direction. The present step is executed by the inclination control unit 72.

Figure 7B:
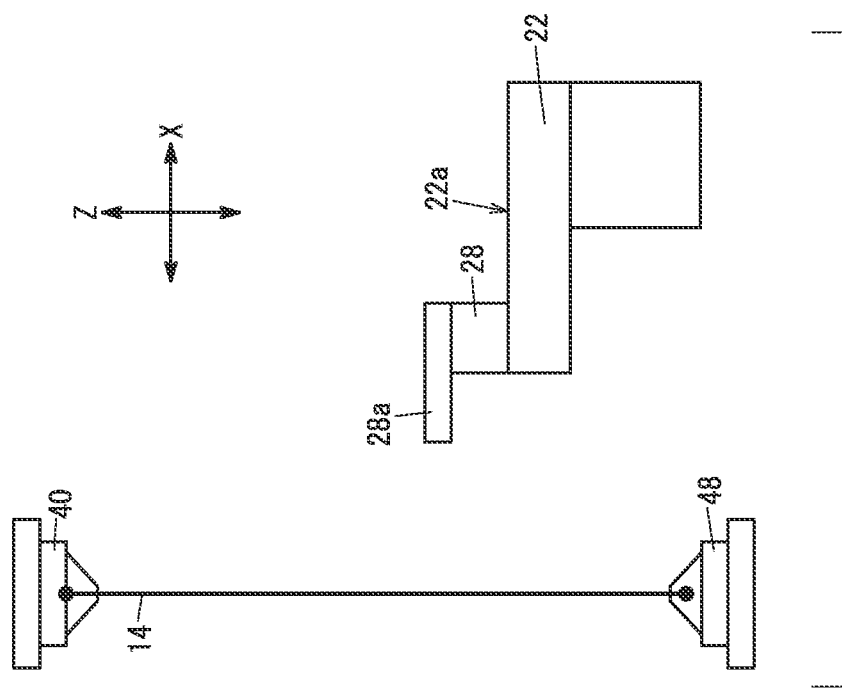
FIG. 7B is a second diagram for describing the inclination control step according to the embodiment.

FIG. 7A is a first diagram for describing the inclination control step according to the embodiment. FIG. 7B is a second diagram for describing the inclination control step according to the embodiment. Each of these figures schematically shows a state in which the upper guide 40, the lower guide 48, the support platform 22, and the jig 28 are viewed along the Y direction.

As shown in FIG. 7A, the inclination control step is carried out in a state in which the jig 28 is supported by the support surface 22a of the support platform 22, together with the wire electrode 14 and the measurement site 28a of the jig 28 being made to face toward each other in the X direction.

When the wire electrode 14 is inclined at the predetermined angle α, the state shown in FIG. 7B is brought about. Moreover, since the specific control when the wire electrode 14 is inclined at the predetermined angle α is already known in the technical field to which the wire electric discharge machine 10 pertains, such a control will not be described in the present embodiment.

The estimation step is a step for determining the aforementioned estimated amount of movement u'. The present step is executed by the estimation unit 78.

Figure 8:
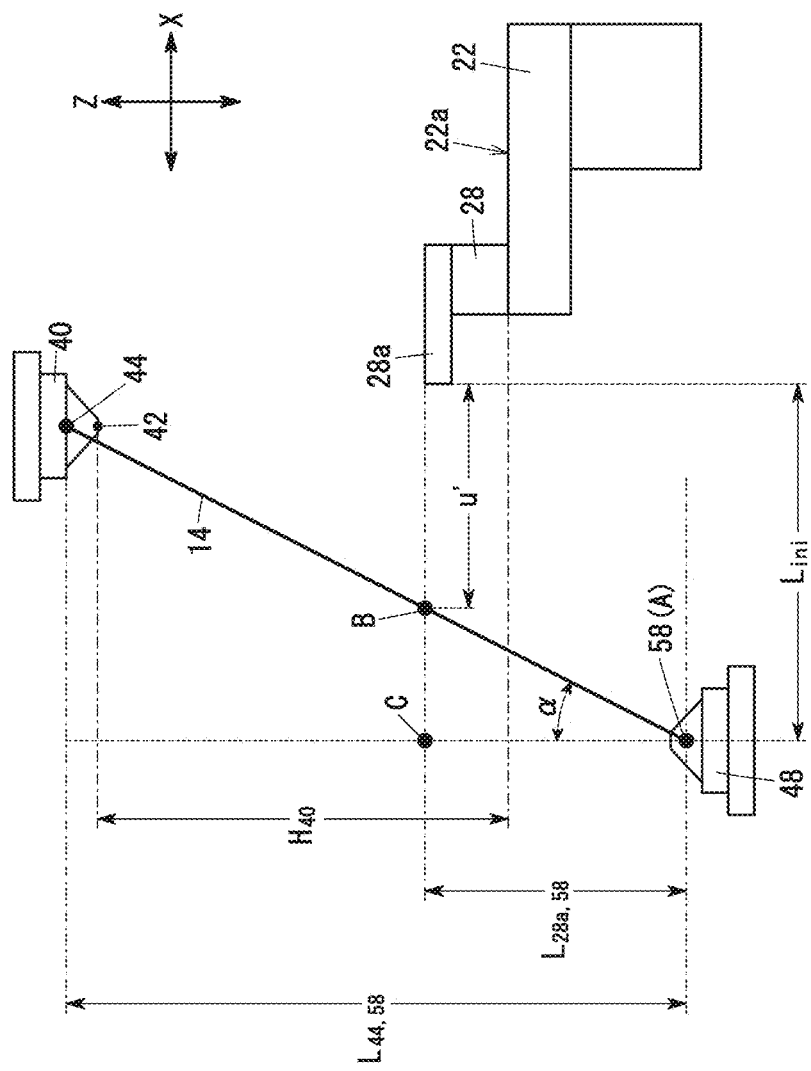
FIG. 8 is a diagram for describing an estimation step according to the embodiment.

FIG. 8 is a diagram for describing the estimation step.

Hereinafter, an example of the arithmetic processing performed by the estimation unit 78 in the estimation step will be described. After having initiated the estimation step, at first as shown in FIG. 8, the estimation unit 78 defines a right triangle ABC in which the angle ∠ACB is a right angle. Among the three vertices of the vertex A, the vertex B, and the vertex C of the right triangle ABC, the vertex A is the lower side supporting point 58. Further, the vertex B is an intersection point between a virtual straight line extending from the measurement site 28a in the X direction, and the inclined wire electrode 14. In addition, the vertex C is an intersection point between the virtual straight line and the wire electrode 14 when placed in a vertical state. The length of the side AC of the right triangle ABC is equivalent to the above-described estimated separation distance.

In this instance, the estimated separation distance may be an approximate value based on the position information 60 prior to being corrected in the present embodiment. In the present embodiment, a difference between the separation distance between the upper side supporting point 44 and the lower side supporting point 58 in the Z direction (the distance between supporting points) $L_{44,58}$, and the separation distance between the reference point 42 of the upper guide 40 and the support platform 22 (the height of the position of the upper guide 40) $H_{40}$ defines the estimated separation distance. Moreover, since the method of measuring the distance between supporting points $L_{44,58}$ and the height $H_{40}$ of the position of the upper guide 40 is already known, the method will not be described in the present embodiment.

Subsequently, the estimation unit 78 determines the length of the side BC, from the length of the side AC (the estimated separation distance) and the predetermined angle α. At this time, the length of the side BC can be easily determined based on the length of the side AC and the tangent of the right triangle ABC (BC=AC×tan α).

In addition, the estimation unit 78 determines the difference between the length of the side BC that was determined and the initial separation distance $L_{ini}$ as the estimated amount of movement u' (u'=$L_{ini}$−BC). The estimation unit 78 temporarily stores the estimated amount of movement u' that was determined, in the storage unit 66. In accordance therewith, the estimation step comes to an end.

The measurement step is a step of measuring the attained amount of movement u which was described previously. The present step is executed by the measurement unit 76.

In the measurement step, the measurement unit 76 first causes the lower guide 48 and the measurement site 28a to be separated from each other by the initial separation distance $L_{ini}$ in the X direction. The control at this time can be realized, for example, by storing in advance in the storage unit 66 the position of the lower guide 48 in which the separation distance in the X direction with respect to the measurement site 28a becomes the initial separation distance $L_{ini}$. That position of the lower guide 48 can be determined as the following position, for example. That is, after the wire electrode 14 has been temporarily made to arrive at the measurement site 28a by undergoing relative movement without being inclined, the wire electrode 14 is moved backward, as it is, by the initial separation distance $L_{ini}$, and the position of the lower guide 48 at this time can be the position where the separation distance in the X direction with respect to the measurement site 28a is the initial separation distance $L_{ini}$.

After the lower guide 48 and the measurement site 28a have been separated in the X direction by the initial separation distance $L_{ini}$, the measurement unit 76 measures the attained amount of movement u by causing the wire electrode 14, which is inclined at the predetermined angle α, to move relatively along the X direction. The relative movement at this time can be realized by issuing a request to the movement control unit 74. The measurement unit 76 temporarily stores the attained amount of movement u that was measured, in the storage unit 66. In accordance therewith, the measurement step comes to an end.

The information correction step is a step of correcting the position information 60 that was stored in the storage step, on the basis of the predetermined angle α and the amount of relative movement. The present step is executed by the information correction unit 80.

Figure 9:
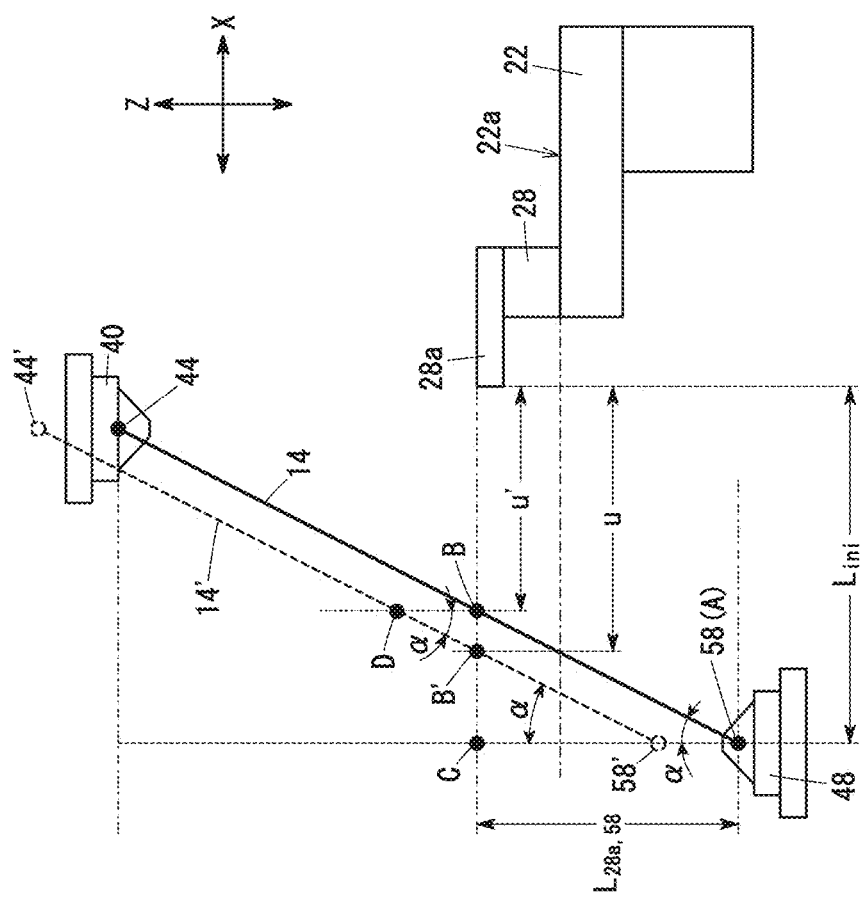
FIG. 9 is a diagram for describing an information correction step according to the embodiment.

FIG. 9 is a diagram for describing the information correction step. Moreover, in FIG. 9, the upper side supporting point 44, the lower side supporting point 58, and the wire electrode 14 supported thereby, which are specified by the position information 60 of the storage unit 66, are shown by solid lines, whereas the actual upper side supporting point 44, the actual lower side supporting point 58, and the actual wire electrode 14 supported thereby are shown by dashed lines. Further, in order to distinguish between them, apostrophes (') have been added to the reference numerals of the actual upper side supporting point 44, the actual lower side supporting point 58, and the actual wire electrode 14 supported thereby.

Hereinafter, an example of the arithmetic processing performed by the information correction unit 80 will be described. First, as shown in FIG. 9, the information correction unit 80 first defines a right triangle DB'B in which the angle ∠DBB' is a right angle. Among the three vertices of the vertex B, the vertex B', and the vertex D of the right triangle DB'B, the vertex B is an intersection point between a virtual straight line extending from the measurement site 28a in the X direction, and the wire electrode 14. Further, the vertex B' is an intersection point between the virtual straight line and the wire electrode 14'. In addition, the vertex D is an intersection point between a virtual straight line extending from the point B along the Z direction, and the wire electrode 14'.

The length of the side BB' of the right triangle DB'B is equivalent to the difference between the estimated amount of movement u' and the attained amount of movement u. In this instance, from the fact that the size of the angle ∠BDB' is the predetermined angle α, the length of the side BD can be easily determined based on the length of the side BB' and the tangent of the right triangle DB'B (BD=BB'/tan α).

The length of the side BD which is determined in this manner is equivalent to a difference in position in the Z direction between the lower side supporting point 58 (or the upper side supporting point 44) and the lower side supporting point 58' (or the upper side supporting point 44'). Accordingly, if such a difference is reflected in the position information 60 of the storage unit 66, the position information 60 is corrected into information having good accuracy.

Moreover, as can be understood from FIG. 9, when the attained amount of movement u is greater than the estimated amount of movement u', it is necessary for the upper side supporting point 44 and the lower side supporting point 58 to be corrected to higher positions. On the other hand, if the attained amount of movement u is less than the estimated amount of movement u', it is necessary for the upper side supporting point 44 and the lower side supporting point 58 to be corrected to lower positions. The corrected position information 60 is stored (updated) in the storage unit 66. In accordance therewith, the information correction step comes to an end, whereupon the correction method of the present embodiment is completed.

As described above, according to the present embodiment, the wire electric discharge machine 10, the correction device 12, and the correction method are provided, which correct with high accuracy the position information 60 indicative of the positions of the supporting points of the upper guide 40 and the lower guide 48.

Moreover, if the measurement step is performed after the inclination control step, the estimation step may be performed before the inclination control step, or may be performed after the measurement step.

[Modifications]

The embodiment has been described above as one example of the present invention. It goes without saying that various modifications or improvements are capable of being added to the above-described embodiment. Further, it is clear from the scope of the claims that other modes to which such modifications or improvements have been added can be included within the technical scope of the present invention.

(Exemplary Modification 1)

Hereinafter, a description will be given concerning the correction device 12 according to a first exemplary modification. However, the constituent elements which have already been described in the embodiment are designated by the same reference numerals, and detail description of such features will be omitted as appropriate.

Figure 10:
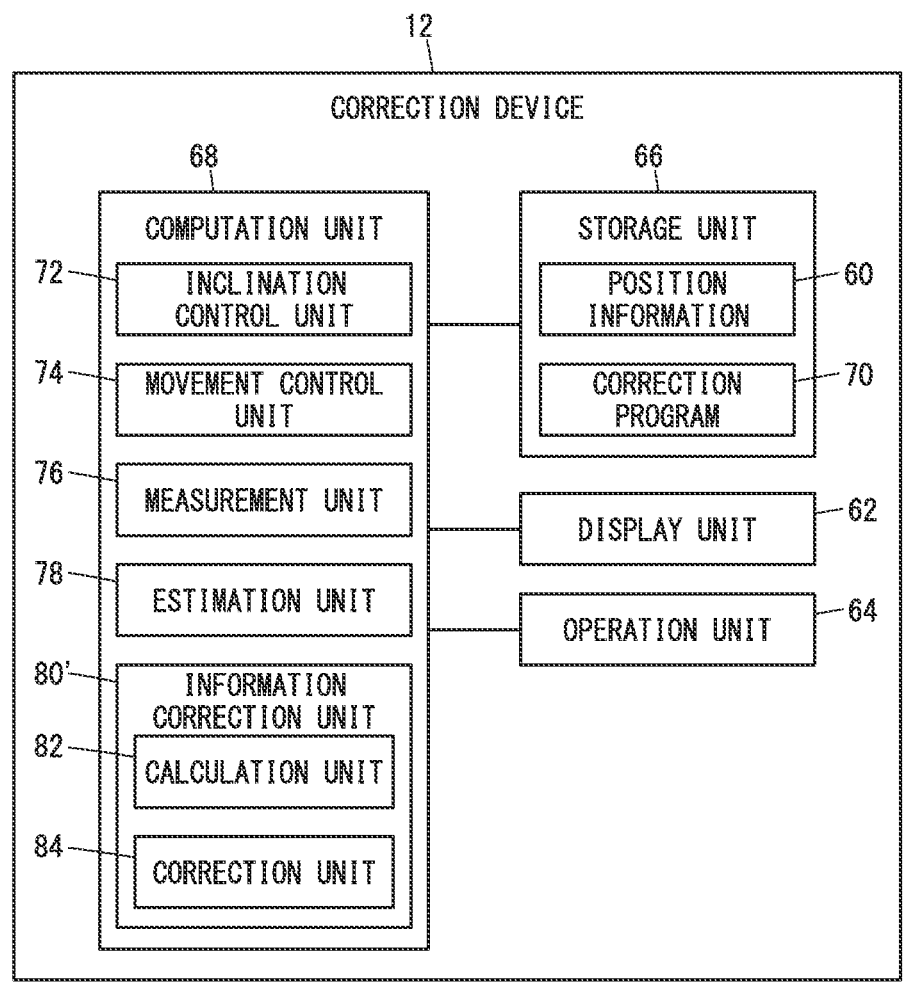
FIG. 10 is a schematic configuration diagram of a correction device according to a first exemplary modification.

FIG. 10 is a schematic configuration diagram of the correction device 12 according to the first exemplary modification.

The correction device 12 according to the present exemplary modification is equipped with substantially the same configuration as that of the correction device 12 of the embodiment, but differs therefrom at least in terms of the point in which the information correction unit 80 includes a calculation unit 82 and a correction unit 84. Hereinafter, for the sake of convenience, the information correction unit 80 according to the present exemplary modification will be referred to as an information correction unit 80'.

Further, when the present exemplary modification is applied, in addition to the information described in the embodiment, it is assumed that the storage unit 66 further stores a first height $H_{28a}$, a second height $H_{40}$, and the distance between supporting points $L_{44,58}$. Among these values, the first height $H_{28a}$ (see FIG. 12) is a height of a position of the measurement site 28a on the support surface 22a in the vertical direction with respect to the support surface 22a. Further, as was described in the embodiment, the second height $H_{40}$ is the separation distance between the reference point 42 of the upper guide 40 and the support platform 22 (the height of the position of the upper guide 40).

Among the elements possessed by the information correction unit 80', the calculation unit 82 calculates a first distance $L_{28a,58}$ (refer to FIG. 12) indicative of the distance in the vertical direction between the lower side supporting point 58 and the measurement site 28a, on the basis of the difference between the initial separation distance $L_{ini}$ and the attained amount of movement u, and the predetermined angle α. Further, together therewith, the second distance $L_{42,44}$ (refer to FIG. 12), which is indicative of the distance in the vertical direction between the reference point 42 and the upper side supporting point 44, is calculated on the basis of the first height $H_{28a}$, the second height $H_{40}$, the distance between supporting points $L_{44,58}$, and the first distance $L_{28a,58}$.

In addition, among the position information 60, the correction unit 84 corrects the information indicative of the position of the upper side supporting point 44 on the basis of the second height $H_{40}$ and the second distance $L_{42,44}$. Further, together therewith, among the position information 60, the information indicative of the position of the lower side supporting point 58 is corrected based on the corrected position of the upper side supporting point 44 and the distance between supporting points $L_{44,58}$.

Figure 11:
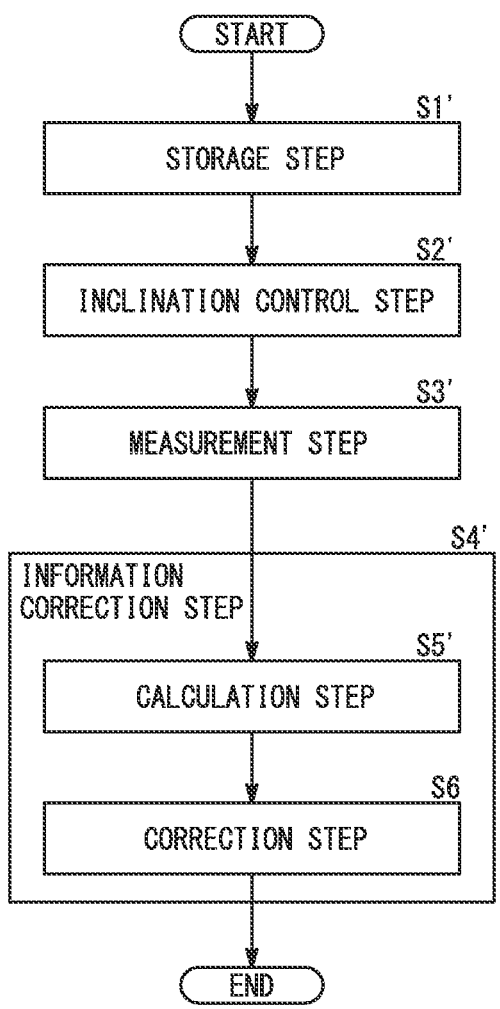
FIG. 11 is a flowchart illustrating a process flow of a correction method according to the first exemplary modification.

FIG. 11 is a flowchart illustrating a process flow of the correction method according to the first exemplary modification.

Hereinafter, a description will be given concerning the correction method according to the present exemplary modification. As shown in FIG. 11, the correction method according to the present exemplary modification includes a storage step (S1'), an inclination control step (S2'), a measurement step (S3'), and an information correction step (S4'). The estimation step that was described in the embodiment is unnecessary in the present exemplary modification.

Among the steps described above, in the storage step, in addition to the information stored in the storage step of the embodiment, there are further stored the aforementioned first height $H_{28a}$, the second height $H_{40}$, and the distance between supporting points $L_{44,58}$. Further, the inclination control step and the measurement step are carried out in the same manner as in the embodiment.

The information correction step includes a calculation step (S5') and a correction step (S6). Among these steps, the calculation step is a step of calculating the first distance $L_{28a,58}$ and the second distance $L_{42,44}$, which is a step executed by the calculation unit 82.

Figure 12:
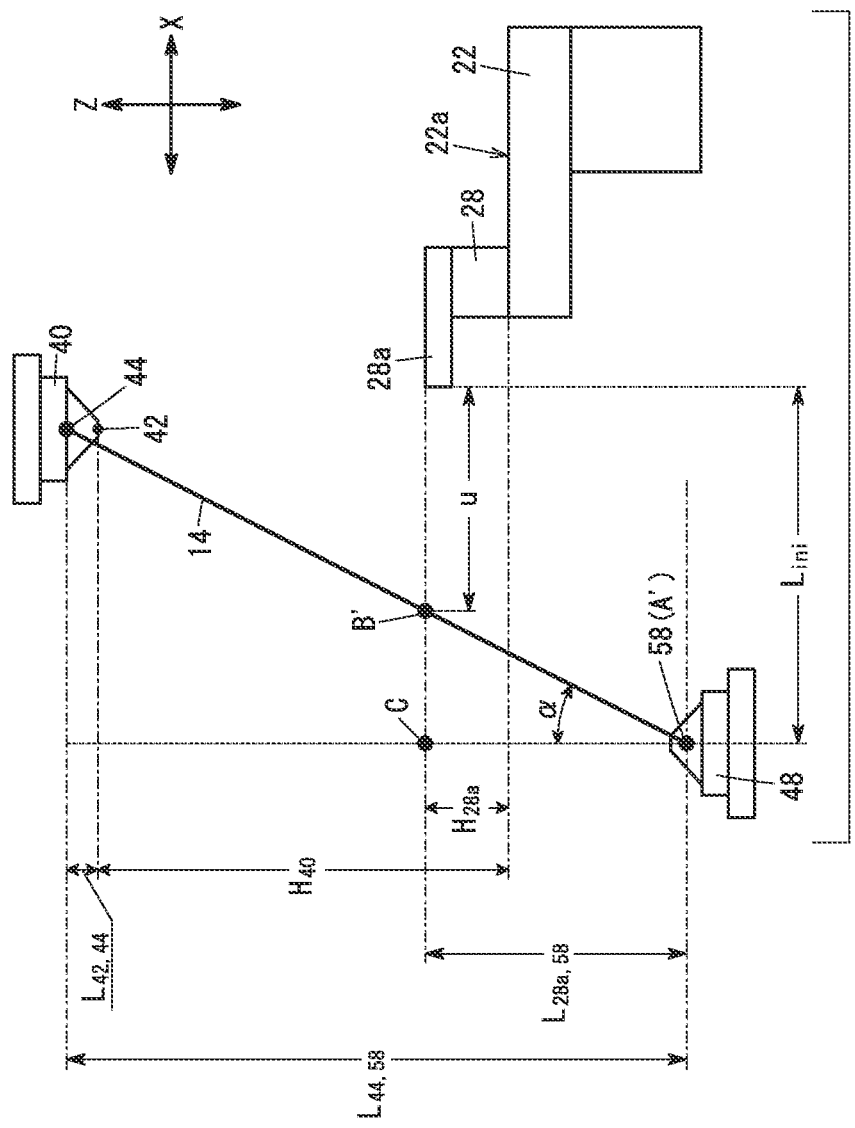
FIG. 12 is a diagram for describing a calculation step according to the first exemplary modification.

FIG. 12 is a diagram for describing the calculation step according to the first exemplary modification. Moreover, in the same manner as in FIG. 9, the vertical direction in FIG. 12 is the Z direction. Further, in the same manner as in FIG. 9, the direction of relative movement is the X direction.

Hereinafter, an example of the arithmetic processing performed in the calculation step will be described. As a premise, at first as shown in FIG. 12, the calculation unit 82 defines a right triangle A'B'C in which the angle ∠MCB' is a right angle. Among the three vertices of the vertex A', the vertex B', and the vertex C of the right triangle A'B'C, the vertex B' is an intersection point between a virtual straight line extending from the measurement site 28a in the X direction, and the wire electrode 14. Further, the vertex C is an intersection point between the virtual straight line and the wire electrode 14 when placed in a vertical state. In addition, the vertex A' is the lower side supporting point 58.

The length of the side B'C of the right triangle A'B'C is equivalent to the difference between the initial separation distance $L_{ini}$, and the attained amount of movement u measured in the measurement step. Further, the length of the side A'C is equivalent to the aforementioned first distance $L_{28a,58}$. In this instance, from the fact that the size of the angle ∠B'A'C is the predetermined angle α, the length of the side A'C can be easily determined based on the length of the side B'C and the tangent of the right triangle A'B'C (A'C=B'C/tan α). The first distance $L_{28a,58}$ can be determined in this manner.

If the first distance $L_{28a,58}$ has been determined, then since the first height $H_{28a}$, the second height $H_{40}$, and the distance between supporting points $L_{44,58}$ are stored by the storage unit 66, then based on these numerical values, it is possible for the calculation unit 82 to further determine the second distance $L_{42,44}$. For example, by subtracting the first height $H_{28a}$ from the first distance $L_{28a,58}$, the distance in the Z direction between the support surface 22a and the lower side supporting point 58 can be determined, and by subtracting the sum of the distance and the second height $H_{40}$ from the distance between supporting points $L_{44,58}$, the second distance $L_{42,44}$ can be determined. The determined second distance $L_{42,44}$ is temporarily stored in the storage unit 66. In accordance therewith, the calculation step comes to an end.

The correction step is a step of correcting the position information 60 on the basis of the numerical values calculated in the calculation step and the information stored in the storage unit 66, which is a step executed by the correction unit 84.

When the position of the upper side supporting point 44 within the position information 60 is corrected in the correction step, as discussed previously, the correction unit 84 can perform such a correction on the basis of the second height $H_{40}$ and the second distance $L_{42,44}$. Further, when the position of the lower side supporting point 58 within the position information 60 is corrected in the correction step, the correction unit 84 can perform such a correction on the basis of the information indicative of the position of the upper side supporting point 44 after correction thereof, and the distance between supporting points $L_{44,58}$. In accordance therewith, the position information 60 is corrected into information having good accuracy.

Exemplary Embodiment 2

Concerning the correction device 12, although it has been described as being integrally constructed together with the control device 18 of the wire electric discharge machine 10, the configuration of the correction device 12 is not necessarily limited to this feature. More specifically, the correction device 12 may be configured as a separate device from the control device 18, and may be provided in the wire electric discharge machine 10.

[Inventions that can be Obtained from the Embodiment]

The inventions that can be grasped from the above-described embodiment and the modifications thereof will be described below.

<First Invention>

In the correction device (12) that corrects the position information (60) indicative of the position of the upper side supporting point (44) of the upper guide (40) and the position of the lower side supporting point (58) of the lower guide (48) of the wire electric discharge machine (10) that supports the wire electrode (14), the wire electric discharge machine (10) includes the support platform (22) including the support surface (22a) that supports the object to be measured (28) including the measurement site (28a), the support platform (22) being arranged between the upper guide (40) and the lower guide (48) in the vertical direction of the support surface (22a), and the correction device (12) includes the storage unit (66) that stores the position information (60), the inclination control unit (72) configured to, in a state in which the wire electrode (14) and the measurement site (28a) of the object to be measured (28) which is supported on the support surface (22a) face toward each other in the direction of relative movement perpendicular to the vertical direction, position the upper guide (40) closer to the measurement site (28a) than the lower guide (48) in the direction of relative movement, to thereby cause the wire electrode (14) to be inclined at the predetermined angle (a), the measurement unit (76) which, by causing relative movement of the upper guide (40) and the lower guide (48) along the direction of relative movement from a state in which the lower guide (48) and the measurement site (28a) are separated from each other by the predetermined distance ($L_{ini}$) in the direction of relative movement, measures the amount of relative movement (u) of the upper guide (40), the lower guide (48), and the wire electrode (14) with respect to the measurement site (28a), caused until the wire electrode (14) which is inclined at the predetermined angle (a) reaches the measurement site (28a), and the information correction unit (80) that corrects the position information (60) in the storage unit (66), based on the predetermined angle (a) and the amount of relative movement (u).

In accordance with such features, the correction device (12) is provided, which is capable of correcting with high accuracy the position information (60) indicative of the position of the supporting point of each of the upper guide (40) and the lower guide (48).

The correction device (12) may further include the estimation unit (78) that determines the estimated amount of movement (u'), which is an estimated value of the amount of relative movement (u), based on an estimated separation distance, which is an estimated value of a separation distance between the lower side supporting point (58) and the measurement site (28a) in the vertical direction, and the predetermined angle (a), wherein the information correction unit (80) may correct the position information (60), based on the difference between the amount of relative movement (u) and the estimated amount of movement (u'), and the predetermined angle (a). In accordance with such features, the correction device (12) is provided, which can correct with high accuracy the position information (60) indicative of the position of the supporting point of each of the upper guide (40) and the lower guide (48).

The upper guide (40) may include the reference point (42) which serves as a reference for representing the position of the upper guide (40) in the vertical direction, the storage unit (66) may further store the first height ($H_{28a}$) indicative of the height of the position of the measurement site (28a) with respect to the support surface (22a) in the vertical direction, the second height ($H_{40}$) indicative of the height of the position of the reference point (42) with respect to the support surface (22a) in the vertical direction, and the distance between supporting points ($L_{44,58}$) indicative of the distance between the upper side supporting point (44) and the lower side supporting point (58) in the vertical direction, and the information correction unit (80) may include the calculation unit (82) that calculates the first distance ($L_{28a,58}$) indicative of the distance between the lower side supporting point (58) and the measurement site (28a) in the vertical direction, based on the difference between the predetermined distance ($L_{ini}$) and the amount of relative movement (u), and the predetermined angle (a), together with calculating the second distance ($L_{42,44}$) indicative of the distance between the reference point (42) and the upper side supporting point (44) in the vertical direction, based on the first height ($H_{28a}$), the second height ($H_{40}$), the distance between supporting points ($L_{44,58}$), and the first distance ($L_{28a,58}$), and the correction unit (84) may correct the information indicative of the position of the upper side supporting point (44) within the position information (60), based on the second height ($H_{40}$) and the second distance ($L_{42,44}$), together with correcting the information indicative of the position of the lower side supporting point (58) within the position information (60), based on the corrected position of the upper side supporting point (44) and the distance between supporting points ($L_{44,58}$). In accordance with such features, the correction device (12) is provided, which can correct with high accuracy the position information (60) indicative of the position of the supporting point of each of the upper guide (40) and the lower guide (48).

<Second Invention>

The wire electric discharge machine (10) includes the upper guide (40) including the upper side supporting point (44) that supports the wire electrode (14), the lower guide (48) including the lower side supporting point (58) that supports the wire electrode (14) together with the upper guide (40), the support platform (22) including the support surface (22a) that supports the object to be measured (28) including the measurement site (28a), the support platform (22) being arranged between the upper guide (40) and the lower guide (48) in the vertical direction of the support surface (22a), the storage unit (66) that stores the position information (60) indicative of the position of the upper side supporting point (44) and the position of the lower side supporting point (58), the inclination control unit (72) which, in a state in which the wire electrode (14) and the measurement site (28a) of the object to be measured (28) which is supported on the support surface (22a) face toward each other in the direction of relative movement perpendicular to the vertical direction, positions the upper guide (40) closer to the measurement site (28a) than the lower guide (48) in the direction of relative movement, to thereby cause the wire electrode (14) to be inclined at the predetermined angle (a), the measurement unit (76) which, by causing relative movement of the upper guide (40) and the lower guide (48) along the direction of relative movement from a state in which the lower guide (48) and the measurement site (28a) are separated from each other by the predetermined distance ($L_{ini}$) in the direction of relative movement, measures the amount of relative movement (u) of the upper guide (40), the lower guide (48), and the wire electrode (14) with respect to the measurement site (28a), caused until the wire electrode (14) which is inclined at the predetermined angle (a) reaches the measurement site (28a), and the information correction unit (80) that corrects the position information (60) in the storage unit (66), based on the predetermined angle (a) and the amount of relative movement (u).

The wire electric discharge machine (10) may further include the estimation unit (78) that determines the estimated amount of movement (u'), which is an estimated value of the amount of relative movement (u), based on an estimated separation distance, which is an estimated value of a separation distance between the lower side supporting point (58) and the measurement site (28a) in the vertical direction, and the predetermined angle (a), wherein the information correction unit (80) may correct the position information (60), based on the difference between the amount of relative movement (u) and the estimated amount of movement (u'), and the predetermined angle (a). In accordance with such features, the wire electric discharge machine (10) is provided, which can correct with high accuracy the position information (60) indicative of the position of the supporting point of each of the upper guide (40) and the lower guide (48).

The upper guide (40) may include the reference point (42) which serves as a reference for representing the position of the upper guide (40) in the vertical direction, the storage unit (66) may further store the first height ($H_{28a}$) indicative of the height of the position of the measurement site (28a) with respect to the support surface (22a) in the vertical direction, the second height ($H_{40}$) indicative of the height of the position of the reference point (42) with respect to the support surface (22a) in the vertical direction, and the distance between supporting points ($L_{44,58}$) indicative of the distance between the upper side supporting point (44) and the lower side supporting point (58) in the vertical direction, and the information correction unit (80) may include the calculation unit (82) that calculates the first distance ($L_{28a,58}$) indicative of the distance between the lower side supporting point (58) and the measurement site (28a) in the vertical direction, based on the difference between the predetermined distance ($L_{ini}$) and the amount of relative movement (u), and the predetermined angle (a), together with calculating the second distance ($L_{42,44}$) indicative of the distance between the reference point (42) and the upper side supporting point (44) in the vertical direction, based on the first height ($H_{28a}$), the second height ($H_{40}$), the distance between supporting points ($L_{44,58}$), and the first distance ($L_{28a,58}$), and the correction unit (84) may correct the information indicative of the position of the upper side supporting point (44) within the position information (60) based on the second height ($H_{40}$) and the second distance ($L_{42,44}$), together with correcting the information indicative of the position of the lower side supporting point (58) within the position information (60), based on the corrected position of the upper side supporting point (44) and the distance between supporting points ($L_{44,58}$). In accordance with such features, the wire electric discharge machine (10) is provided, which is capable of correcting with high accuracy the position information (60) indicative of the position of the supporting point of each of the upper guide (40) and the lower guide (48).

<Third Invention>

In the correction method that corrects the position information (60) indicative of the position of the upper side supporting point (44) of the upper guide (40) and the position of the lower side supporting point (58) of the lower guide (48) of the wire electric discharge machine (10) that supports the wire electrode (14), the wire electric discharge machine (10) includes the support platform (22) including the support surface (22a) that supports the object to be measured (28) including the measurement site (28a), the support platform (22) being arranged between the upper guide (40) and the lower guide (48) in the vertical direction of the support surface (22a), and the correction method includes the storage step of storing the position information (60), the inclination control step of, in a state in which the wire electrode (14) and the measurement site (28a) of the object to be measured (28) which is supported on the support surface (22a) face toward each other in the direction of relative movement perpendicular to the vertical direction, positioning the upper guide (40) closer to the measurement site (28a) than the lower guide (48) in the direction of relative movement, and thereby causing the wire electrode (14) to be inclined at the predetermined angle (a), the measurement step of, by causing relative movement of the upper guide (40) and the lower guide (48) along the direction of relative movement from a state in which the lower guide (48) and the measurement site (28a) are separated from each other by the predetermined distance ($L_{ini}$) in the direction of relative movement, measuring the amount of relative movement (u) of the upper guide (40), the lower guide (48), and the wire electrode (14) with respect to the measurement site (28a), caused until the wire electrode (14) which is inclined at the predetermined angle (a) reaches the measurement site (28a), and the information correction step of correcting the position information (60) stored in the storage step, based on the predetermined angle ($\alpha$) and the amount of relative movement (u).

In accordance with such features, the correction method is provided, which can correct with high accuracy the position information (60) indicative of the position of the supporting point of each of the upper guide (40) and the lower guide (48).

The method may further include the estimation step of determining the estimated amount of movement (u'), which is an estimated value of the amount of relative movement (u), based on an estimated separation distance, which is an estimated value of a separation distance between the lower side supporting point (58) and the measurement site (28a) in the vertical direction, and the predetermined angle (a), wherein, in the information correction step, the position information (60) may be corrected, based on the difference between the amount of relative movement (u) and the estimated amount of movement (u'), and the predetermined angle (a). In accordance with such features, the correction method is provided, which is capable of correcting with high accuracy the position information (60) indicative of the position of the supporting point of each of the upper guide (40) and the lower guide (48).

The upper guide (40) may include the reference point (42) which serves as a reference for representing the position of the upper guide (40) in the vertical direction, the storage step may further store the first height ($H_{28a}$) indicative of the height of the position of the measurement site (28a) with respect to the support surface (22a) in the vertical direction, the second height ($H_{40}$) indicative of the height of the position of the reference point (42) with respect to the support surface (22a) in the vertical direction, and the distance between supporting points ($L_{44,58}$) indicative of the distance between the upper side supporting point (44) and the lower side supporting point (58) in the vertical direction, and in the information correction step, there may further be provided the calculation step of calculating the first distance ($L_{28a,58}$) indicative of the distance between the lower side supporting point (58) and the measurement site (28a) in the vertical direction, based on the difference between the predetermined distance ($L_{ini}$) and the amount of relative movement (u), and the predetermined angle (a), together with calculating the second distance ($L_{42,44}$) indicative of the distance between the reference point (42) and the upper side supporting point (44) in the vertical direction, based on the first height ($H_{28a}$), the second height ($H_{40}$), the distance between supporting points ($L_{44,58}$), and the first distance ($L_{28a,58}$), and the correction step of correcting the information indicative of the position of the upper side supporting point (44) within the position information (60), based on the second height ($H_{40}$) and the second distance ($L_{42,44}$), together with correcting the information indicative of the position of the lower side supporting point (58) within the position information (60), based on the corrected position of the upper side supporting point (44) and the distance between supporting points ($L_{44,58}$). In accordance with such features, the correction method is provided, which can correct with high accuracy the position information (60) indicative of the position of the supporting point of each of the upper guide (40) and the lower guide (48).

The invention claimed is:

1. A correction device configured to correct position information indicative of a position of an upper side supporting point of an upper guide and a position of a lower side supporting point of a lower guide of a wire electric discharge machine configured to support a wire electrode,
    wherein the wire electric discharge machine comprises a support platform including a support surface configured to support an object to be measured including a measurement site, the support platform being arranged between the upper guide and the lower guide in a vertical direction of the support surface; and
    wherein
    the correction device comprises one or more processors and a memory,
    the memory configured to store the position information
    the one or more processors execute computer-executable instructions stored in the memory to cause the correction device to:
    control the wire electric discharge machine and, in a state in which the wire electrode and the measurement site of the object to be measured which is supported on the support surface face toward each other in a direction of relative movement perpendicular to the vertical direction, position the upper guide closer to the measurement site than the lower guide in the direction of relative movement, to thereby cause the wire electrode to be inclined at a predetermined angle;
    control the wire electric discharge machine and, by causing relative movement of the upper guide and the lower guide along the direction of relative movement from a state in which the lower guide and the measurement site are separated from each other by a predetermined distance in the direction of relative movement, measure an amount of relative movement of the upper guide, the lower guide, and the wire electrode with respect to the measurement site, caused until the wire electrode which is inclined at the predetermined angle reaches the measurement site; and
    based on the predetermined angle and the amount of relative movement, the position information stored in the memory.

2. The correction device according to claim 1, wherein the one or more processors cause the correction device to:
    determine an estimated amount of movement, which is an estimated value of the amount of relative movement, based on an estimated separation distance, which is an estimated value of a separation distance between the lower side supporting point and the measurement site in the vertical direction, and based on the predetermined angle, correct the position information, based on a difference between the amount of relative movement and the estimated amount of movement, and the predetermined angle.

3. The correction device according to claim 1, wherein:

the upper guide includes a reference point which serves as a reference for representing a position of the upper guide in the vertical direction;

the memory further stores a first height indicative of a height of a position of the measurement site with respect to the support surface in the vertical direction, a second height indicative of a height of a position of the reference point with respect to the support surface in the vertical direction, and a distance between supporting points indicative of a distance between the upper side supporting point and the lower side supporting point in the vertical direction; and the one or more processors cause the correction device to:

calculate a first distance indicative of a distance between the lower side supporting point and the measurement site in the vertical direction, based on a difference between the predetermined distance and the amount of relative movement, and the predetermined angle, and further calculate a second distance indicative of a distance between the reference point and the upper side supporting point in the vertical direction, based on the first height, the second height, the distance between supporting points, and the first distance; and correct information indicative of the position of the upper side supporting point within the position information, based on the second height and the second distance, and further correct information indicative of the position of the lower side supporting point within the position information, based on the corrected position of the upper side supporting point and the distance between supporting points.

4. A wire electric discharge machine, comprising:

an upper guide including an upper side supporting point configured to support a wire electrode;

a lower guide including a lower side supporting point configured to support the wire electrode together with the upper guide;

a support platform including a support surface configured to support an object to be measured including a measurement site, the support platform being arranged between the upper guide and the lower guide in a vertical direction of the support surface; and the correction device according to claim 1.

5. The wire electric discharge machine according to claim 4, the one or more processors cause the correction device to:

determine an estimated amount of movement, which is an estimated value of the amount of relative movement, based on an estimated separation distance, which is an estimated value of a separation distance between the lower side supporting point and the measurement site in the vertical direction, and the predetermined angle; and correct the position information, based on a difference between the amount of relative movement and the estimated amount of movement, and the predetermined angle.

6. The wire electric discharge machine according to claim 4, wherein:

the upper guide includes a reference point which serves as a reference for representing a position of the upper guide in the vertical direction;

the memory further stores a first height indicative of a height of a position of the measurement site with respect to the support surface in the vertical direction, a second height indicative of a height of a position of the reference point with respect to the support surface in the vertical direction, and a distance between supporting points indicative of a distance between the upper side supporting point and the lower side supporting point in the vertical direction; and the one or more processors cause the correction device to:

calculate a first distance indicative of a distance between the lower side supporting point and the measurement site in the vertical direction, based on a difference between the predetermined distance and the amount of relative movement, and the predetermined angle, and further calculate a second distance indicative of a distance between the reference point and the upper side supporting point in the vertical direction, based on the first height, the second height, the distance between supporting points, and the first distance; and correct information indicative of the position of the upper side supporting point within the position information, based on the second height and the second distance, and further correct information indicative of the position of the lower side supporting point within the position information, based on the corrected position of the upper side supporting point and the distance between supporting points.

7. A correction method of correcting, by a correction device, position information indicative of a position of an upper side supporting point of an upper guide and a position of a lower side supporting point of a lower guide of a wire electric discharge machine configured to support a wire electrode, wherein the wire electric discharge machine comprises a support platform including a support surface configured to support an object to be measured including a measurement site, the support platform being arranged between the upper guide and the lower guide in a vertical direction of the support surface, and the correction device comprises one or more processors configured to execute computer-executable instruction in memory, the correction method comprising:

storing, in the memory, the position information;

controlling, by the correction device, the wire electric discharge machine and, in a state in which the wire electrode and the measurement site of the object to be measured which is supported on the support surface face toward each other in a direction of relative movement perpendicular to the vertical direction, positioning the upper guide closer to the measurement site than the lower guide in the direction of relative movement, and thereby causing the wire electrode to be inclined at a predetermined angle;

controlling, by the correction device, the wire electric discharge machine and, by causing relative movement of the upper guide and the lower guide along the direction of relative movement from a state in which the lower guide and the measurement site are separated from each other by a predetermined distance in the direction of relative movement, measuring an amount of relative movement of the upper guide, the lower guide, and the wire electrode with respect to the measurement site, caused until the wire electrode which is inclined at the predetermined angle reaches the measurement site; and correcting, by the correction device, the position information stored in the memory, based on the predetermined angle and the amount of relative movement.

8. The correction method according to claim 7, further comprising:

determining, by the correction device, an estimated amount of movement, which is an estimated value of the amount of relative movement, based on an estimated separation distance, which is an estimated value of a separation distance between the lower side supporting point and the measurement site in the vertical direction, and the predetermined angle, in a case where the position information is corrected, correcting, by the correction device, the position information, based on a difference between the amount of relative movement and the estimated amount of movement, and the predetermined angle.

9. The correction method according to claim 7, wherein:

the upper guide includes a reference point which serves as a reference for representing a position of the upper guide in the vertical direction;

the memory further stores a first height indicative of a height of a position of the measurement site with respect to the support surface in the vertical direction, a second height indicative of a height of a position of the reference point with respect to the support surface in the vertical direction, and a distance between supporting points indicative of a distance between the upper side supporting point and the lower side supporting point in the vertical direction; and in a case where the position information is corrected, calculating, by the correcting device, a first distance indicative of a distance between the lower side supporting point and the measurement site in the vertical direction, based on a difference between the predetermined distance and the amount of relative movement, and the predetermined angle, and further calculating a second distance indicative of a distance between the reference point and the upper side supporting point in the vertical direction, based on the first height, the second height, the distance between supporting points, and the first distance; and by correcting, by the correcting device, information indicative of the position of the upper side supporting point within the position information, based on the second height and the second distance, and further correcting information indicative of the position of the lower side supporting point within the position information, based on the corrected position of the upper side supporting point and the distance between supporting points.

* * * * *

UNITED STATES PATENT AND TRADEMARK OFFICE
CERTIFICATE OF CORRECTION

PATENT NO. : 12,459,043 B2
APPLICATION NO. : 17/800823
DATED : November 4, 2025
INVENTOR(S) : Tomohito Oosawa and Hiroyuki Furukawa It is certified that error appears in the above-identified patent and that said Letters Patent is hereby corrected as shown below:

In the Claims

Column 18, Claim 1, Lines 59-61, please change "based on the predetermined angle and the amount of relative movement, the position information stored in the memory" to: --correct, based on the predetermined angle and the amount of relative movement, the position information stored in the memory--

Signed and Sealed this
Twenty-third Day of December, 2025

John A. Squires
*Director of the United States Patent and Trademark Office*